(12) United States Patent
Vasudevan et al.

(10) Patent No.: US 11,836,793 B2
(45) Date of Patent: Dec. 5, 2023

(54) INVOICE DEFERRAL RECOMMENDATION

(71) Applicant: International Business Machines Corporation, Armonk, NY (US)

(72) Inventors: Shrihari Vasudevan, Chennai (IN); Sudhanshu Shekhar Singh, New Delhi (IN); Rakesh Rameshrao Pimplikar, Bangalore (IN); Gyana Ranjan Parija, Gurgaon (IN); Jasmina Mohorn, Durham, NC (US); Didier Denove, Berlin (DE); Magesh A Narayanan, New Albany, OH (US); Khalid Siddiqui, Cracow (PL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 17/119,026

(22) Filed: Dec. 11, 2020

(65) Prior Publication Data

US 2022/0188920 A1 Jun. 16, 2022

(51) Int. Cl.
*G06Q 40/02* (2023.01)
*G06Q 40/00* (2023.01)
*G06Q 30/00* (2023.01)
*G06Q 40/03* (2023.01)
*G06N 5/043* (2023.01)
*G06Q 40/12* (2023.01)
*G06Q 30/016* (2023.01)
*G06Q 30/04* (2012.01)

(52) U.S. Cl.
CPC ............ *G06Q 40/03* (2023.01); *G06N 5/043* (2013.01); *G06Q 30/016* (2013.01); *G06Q 30/04* (2013.01); *G06Q 40/12* (2013.12)

(58) Field of Classification Search
CPC .... G06Q 40/025; G06Q 40/12; G06Q 30/016; G06Q 30/04; G06N 5/043
See application file for complete search history.

(56) References Cited

U.S. PATENT DOCUMENTS

| 5,483,445 A | 1/1996 | Pickering |
| 6,044,138 A | 3/2000 | Graham et al. |
| 6,052,674 A * | 4/2000 | Zervides ............... G06Q 30/04 705/40 |

(Continued)

OTHER PUBLICATIONS

Veena Gundavelli, "Leading Order-to-Cash Amid COVID-19", EMAGIA, Accessed on Jun. 18, 2020, 3 pages, EMAGIA.

(Continued)

*Primary Examiner* — Talia F Crawley
(74) *Attorney, Agent, or Firm* — Ference & Associates LLC

(57) ABSTRACT

One embodiment provides a computer implemented method, including: receiving information corresponding to a customer of a seller, wherein the information is related to credit information of the customer; generating a credit attribute for the customer with respect to the seller, wherein the generating includes utilizing a plurality of artificial intelligence agents that each analyze at least a subset of the information to each generate an agent version of the credit attribute; and recommending a deferral of at least a portion of a pending invoice of the seller for the customer, wherein a value of the deferral is based upon the credit attribute.

16 Claims, 3 Drawing Sheets

(56) References Cited

U.S. PATENT DOCUMENTS

| | | | |
|---|---|---|---|
| 6,337,901 B1 | 1/2002 | Rome et al. | |
| 6,625,267 B1 | 9/2003 | Graham et al. | |
| 6,807,533 B1* | 10/2004 | Land | G06Q 40/02 |
| | | | 705/30 |
| 6,847,942 B1* | 1/2005 | Land | G06Q 30/04 |
| | | | 705/30 |
| 7,146,332 B2 | 12/2006 | Owen, Jr. | |
| 7,194,431 B1* | 3/2007 | Land | G06Q 30/06 |
| | | | 705/28 |
| 7,236,950 B2 | 6/2007 | Savage et al. | |
| 7,340,433 B1* | 3/2008 | Kay | G06Q 40/00 |
| | | | 705/38 |
| 7,539,635 B1* | 5/2009 | Peak | G06Q 40/123 |
| | | | 705/31 |
| 7,580,884 B2* | 8/2009 | Cook | G06Q 40/02 |
| | | | 705/38 |
| 8,027,915 B2 | 9/2011 | Koningstein et al. | |
| 8,090,649 B2 | 1/2012 | Galit et al. | |
| 8,326,747 B2 | 12/2012 | Ang et al. | |
| 8,666,880 B2 | 3/2014 | Ang et al. | |
| 8,818,875 B2 | 8/2014 | Karnin et al. | |
| 10,223,745 B1* | 3/2019 | Randhawa | G06Q 40/02 |
| 10,445,739 B1* | 10/2019 | Sahni | G06Q 20/405 |
| 10,997,592 B1* | 5/2021 | Kurani | G06Q 20/3821 |
| 2005/0283433 A1* | 12/2005 | Reid | G06Q 20/02 |
| | | | 705/39 |
| 2006/0015363 A1* | 1/2006 | Allu | G06Q 30/04 |
| | | | 705/34 |
| 2007/0083459 A1 | 4/2007 | Eubanks | |
| 2009/0216582 A1* | 8/2009 | Moran | G06Q 30/04 |
| | | | 705/7.38 |
| 2012/0136780 A1* | 5/2012 | El-Awady | G06Q 20/102 |
| | | | 705/40 |
| 2014/0278730 A1* | 9/2014 | Muhart | G06Q 10/0635 |
| | | | 705/7.28 |
| 2018/0082283 A1* | 3/2018 | Sharma | G06Q 20/42 |
| 2018/0268487 A1* | 9/2018 | Matthews | G06Q 40/06 |
| 2021/0342802 A1* | 11/2021 | Heffron | G06Q 30/04 |
| 2022/0092198 A1* | 3/2022 | Afroz | G06F 21/602 |

OTHER PUBLICATIONS

Atrideb Basu, "E-shopping to mobile recharges, Indian banks have a wealth of data to check creditworthiness", QUARTZ INDIA, Apr. 20, 2020, 4 pages, Quartz India.

Author Unknown, "Making Credit Decisions", Accessed on Dec. 7, 2020, 24 pages, Copy available at: http://web.nacm.org/pdfs/educ_presentations/Principles_Ch13_v3.pdf.

John D. Stowe et al., "A Billing Policy for Credit Customers", Managerial and Decision Economics, Oct. 1991, 11 pages, vol. 12, No. 5, Wiley.

Sai Zeng et al., "Using Predictive Analysis to Improve Invoice-to-Cash Collection", KDD '08, Aug. 24-27, 2008, Las Vegas, Nevada USA, 8 pages, ACM Digital Library.

Hyland, "2018 State of Accounts Payable Report—A Look at Current Accounts Payable Operations, Challenges, Visibility and Control", 2018, 23 pages, IDT.

IOFM White Paper, "Six Promising Trends in Accounts Payable", Institute of Finance & Management, 2015, 23 pages, IOFM.

Ipayables, "Why Automation Matters—A Survey Study of the Modern Accounts Payable Department", iPayables—Accounts Payable Automation, 2016, 8 pages, iPayables.

Mark Brousseau, "The Future of Accounts Payable", APP2P Conference & Expo, May 7-9, 2017, Disney's Yacht & Beach Club Resorts, Florida, USA, 38 pages, IOFM.

* cited by examiner

INVOICE DEFERRAL RECOMMENDATION

BACKGROUND

Many entities interact to buy services, products, or the like, from other entities. Some of these transactions are simple transactions, for example, a customer entering a store and buying a product within the store. By the time the customer leaves the store with the purchased product, the transaction has been completed between the customer and the seller with the customer receiving the product and the seller receiving compensation in return. However, a large majority of the transactions that occur are between entities where the seller sends an invoice to the customer for the customer to pay at some point in the future. For example, corporations that have engaged in complex transactions that may include multiple steps or products, a length of time to perform the services, deliver the product, or the like, may receive invoices during different portions of the transaction, upon completion of milestones, upon receiving a particular portion of the product, or the like. These invoices are sent to the customer for the customer to pay within a predetermined time period. Additionally, the seller or an agent of the seller may contact the customer or an agent of the customer to ensure satisfaction with the services, product, or the like.

BRIEF SUMMARY

In summary, one aspect of the invention provides a computer implemented method, including: receiving information corresponding to a customer of a seller, wherein the information is related to credit information of the customer; generating a credit attribute for the customer with respect to the seller, wherein the generating includes utilizing a plurality of artificial intelligence agents that each analyze at least a subset of the information to each generate an agent version of the credit attribute; and recommending a deferral of at least a portion of a pending invoice of the seller for the customer, wherein a value of the deferral is based upon the credit attribute.

Another aspect of the invention provides an apparatus, including: at least one processor; and a computer readable storage medium having computer readable program code embodied therewith and executable by the at least one processor: wherein the computer readable program code is configured to receive information corresponding to a customer of a seller, wherein the information is related to credit information of the customer; wherein the computer readable program code is configured to generate a credit attribute for the customer with respect to the seller, wherein the generating includes utilizing a plurality of artificial intelligence agents that each analyze at least a subset of the information to each generate an agent version of the credit attribute; and wherein the computer readable program code is configured to recommend a deferral of at least a portion of a pending invoice of the seller for the customer, wherein a value of the deferral is based upon the credit attribute.

An additional aspect of the invention provides a computer program product, including: a computer readable storage medium having computer readable program code embodied therewith, the computer readable program code executable by a processor: wherein the computer readable program code is configured to receive information corresponding to a customer of a seller, wherein the information is related to credit information of the customer; wherein the computer readable program code is configured to generate a credit attribute for the customer with respect to the seller, wherein the generating includes utilizing a plurality of artificial intelligence agents that each analyze at least a subset of the information to each generate an agent version of the credit attribute; and wherein the computer readable program code is configured to recommend a deferral of at least a portion of a pending invoice of the seller for the customer, wherein a value of the deferral is based upon the credit attribute.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

Figure 1:
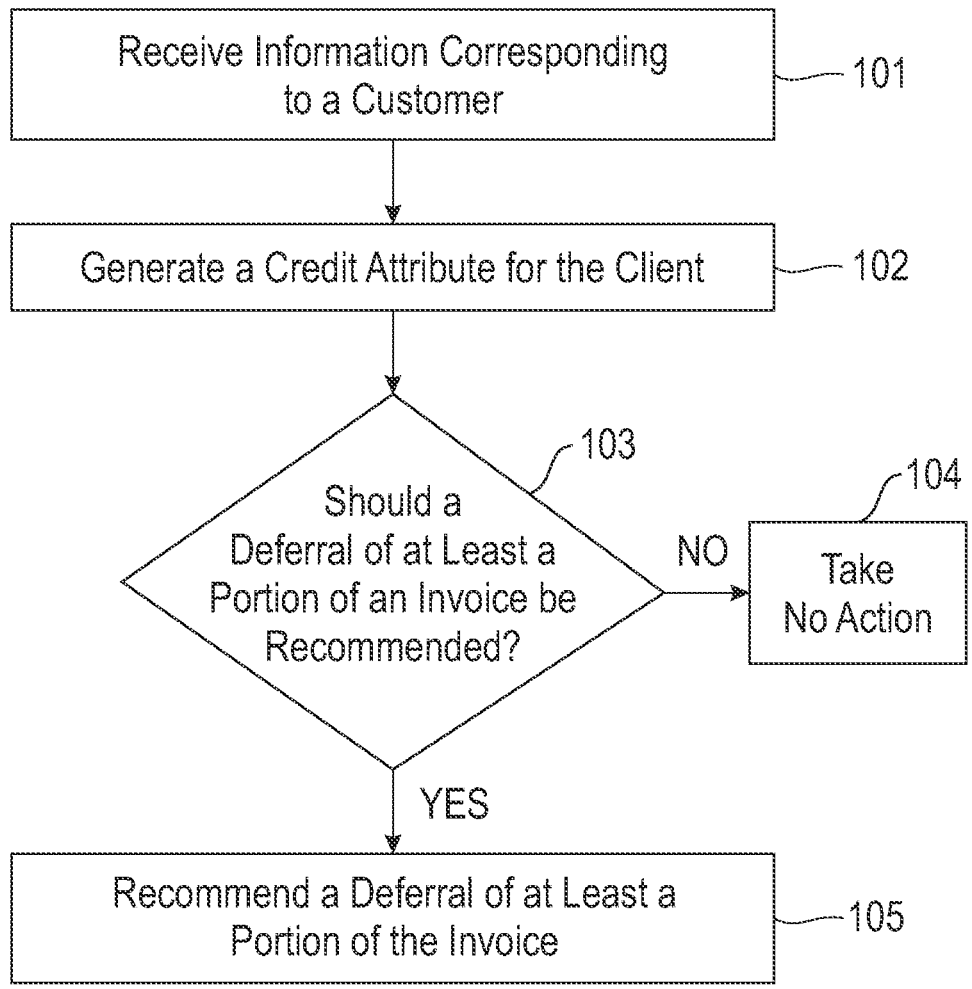
FIG. 1 illustrates a method of providing recommendations for invoice deferrals based upon an internally generated credit attribute that is generated using artificial intelligence agents using credit information.

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The illustrated embodiments of the invention will be best understood by reference to the figures. The following description is intended only by way of example and simply illustrates certain selected exemplary embodiments of the invention as claimed herein. It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Specific reference will be made here below to FIGS. 1-3. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 3. In accordance with an example embodiment, most if not all of the process steps, components and outputs discussed with respect to FIGS. 1-2 can be performed or utilized by way of a processing unit or units and system memory such as those indicated, respectively, at 16' and 28' in FIG. 3, whether on a server computer, a client computer, a node computer in a distributed network, or any combination thereof.

Upon receiving an invoice, the customer may be unable to pay all or a portion of the invoice within the prescribed time period. Accordingly, the customer or an agent of the customer may contact the seller and ask for a deferral of all or a portion of the invoice until the customer is able to make payment. The seller or an agent of the seller must then make a decision regarding whether the invoice or a portion of the invoice can be deferred. Traditionally, the deferral decision is made by an agent of the seller and is based upon a judgement of the seller's agent. While this judgement may be based upon a history with the customer, it is generally not based upon specific data. Additionally, multiple agents of the seller may have different personal policies when approving deferrals. For example, one agent may approve all deferral requests, while another agent never approves deferral requests. Accordingly, the deferral decisions are very inconsistent across the organization of the seller and also mainly based upon a personal opinion of the agent making the decision, which may result in approved deferrals that are never paid and should have not been approved.

Accordingly, an embodiment provides a system and method for providing recommendations for invoice deferrals based upon an internally generated credit attribute that is generated using artificial intelligence agents using credit information. The system receives information corresponding to a customer of a seller. This information is related to credit information of the customer. For example, the information may include credit information from external credit agencies. As another example, the information may also include internal historical invoice/payment information, for example, amounts of previous invoices and a payment history of the customer with respect to those invoices. As a final example, the information may include external market sentiment information, for example, news stories, competitor or partner feedback, or the like, that may indicate a credit worthiness of a customer.

Utilizing the information, the system generates a credit attribute for the customer with respect to the seller. In other words, the system generates a credit attribute that is unique to the seller with respect to the customer. This means that different entities that may have the same customer may have different credit attribute values for that same customer. The credit attribute may be a credit line, credit score, or the like, which may be used internally with the seller's entity. To generate the credit attribute the system utilizes a plurality of artificial intelligence agents that each generates an agent version of the credit attribute based upon different portions of the information. The agent versions of the credit attribute are then aggregated in some manner to make a final credit attribute. The system uses the final credit attribute to make a recommendation regarding deferrals of an invoice of the seller for the customer. The recommendation is made before the invoice is even generated so the buyer does not have to request the deferral as in conventional methods.

Such a system provides a technical improvement over current systems for deferral determinations. Instead of relying on agents of the seller to make decisions based upon personal preference, the described system and method provides a data driven approach for approving deferrals. Additionally, since the described system and method utilizes artificial intelligence agents instead of humans to make the deferral decision, the deferral decisions are more consistent across the seller entity. In other words, because the same system makes all deferral decisions, the decisions are all based upon the same factors and are, therefore, consistent in approvals across all customers of the seller. Thus, the described system and method results in more consistent deferral decisions than traditional deferral decision techniques. Additionally, the deferral decisions are based upon data instead of personal preference as found in the conventional techniques. Finally, since the deferral recommendations are made before the invoices are generated, the buyer does not have to make a deferral request which allows the seller to make a more accurate budget with respect to timing of money being received within the entity.

FIG. 1 illustrates a method for providing recommendations for invoice deferrals based upon an internally generated credit attribute that is generated using artificial intelligence agents using credit information. At 101 the system receives information corresponding to a customer of a seller. The customer may be a person or entity that has entered into or is attempting to enter into a transaction agreement with the seller to pay for a service, product, or the like, that results in an invoice to be sent to the customer from the seller. The information may be related to credit information of the customer, for example, information that can be used to determine a credit worthiness of the customer. The credit worthiness is not a global credit worthiness, but instead a credit worthiness unique to the seller. While the seller may share a credit worthiness value with a partner, ally, competitor, or other entity, the credit worthiness is determined by the seller, so the seller identifies the information that is of importance to the seller with respect to credit worthiness. Thus, different entities that employ the described system may utilize different information to determine the credit worthiness. Additionally, the information may be weighted differently between different entities.

The information may be obtained from one or more different sources. One non-limiting example of information may include information received from an external credit agency, for example, a global credit agency that determines credit values for people or entities. This information may include a credit value as determined by the external credit agency. It may also include information that was utilized by the external credit agency to determine the credit value of the credit agency. Another non-limiting example of information includes information related to a payment history of the customer with respect to the seller. In other words, this information may be internal historical information of the customer. The information may include amounts of previous invoices and payment amounts, payment dates with respect to invoice due dates, and the like. A final non-limiting example of information includes market sentiment data. Market sentiment data may include market data received from an external source, for example, a competitor, partner, other entity in the industry, or the like. This information may include a credit worthiness value determined by the external source, historical payment information of the external source with respect to the customer, or the like.

At 102 the system generates a credit attribute for the customer with respect to the seller. Since the seller is utilizing information to make a determination regarding internal invoices, the credit attribute is generated for the seller. In other words, two entities that have the same customer and that utilize the described system may have two completely different credit attributes for the same customer. This difference may be related to a risk level of the seller, internal information of the seller with respect to the customer, or other attributes or factors unique to different sellers or seller/customer relationships. The credit attribute may be a credit line which identifies an amount or value of money that can be extended to the customer. Additionally, or alternatively, the credit attribute may be a credit score which corresponds to a credit worthiness value as determined by the seller.

To generate the credit attribute the system utilizes a plurality of artificial intelligence agents that each analyzes at least a subset of the information to each generate an agent version of the credit attribute. Each of the agents may analyze a different source of information and, therefore, may analyze different portions or subsets of the information. For example, one of the agents may analyze historical internal information, another agent may analyze external credit agency information, and a third agent may analyze external market sentiment data. The example of three agents is used throughout this disclosure; however this number of agents is non-limiting and more or less agents can be utilized. Additionally, each of the agents may analyze different information, overlapping information, or the like. The information that was received at 101 may be stored in a data repository that each of the agents may access to analyze the information. Thus, the information may not be moved to the agents, but may be kept within the data repository and each of the agents access the information in the data repository.

Each of the agents generates an agent version of the credit attribute. In other words, each of the agents generates a value for the credit attribute irrespective of any analysis performed by another of the agents. Once each of the agents has an agent version of the credit attribute, the agent versions are aggregated to create a single credit attribute. The aggregation may occur using one of two techniques. The selected technique is dependent upon whether the agents are set up to communicate among themselves or not. FIG. 2 illustrates an example illustration of the analysis by the agents and the techniques for aggregating the agent versions of the credit attribute into a single attribute.

Figure 2:
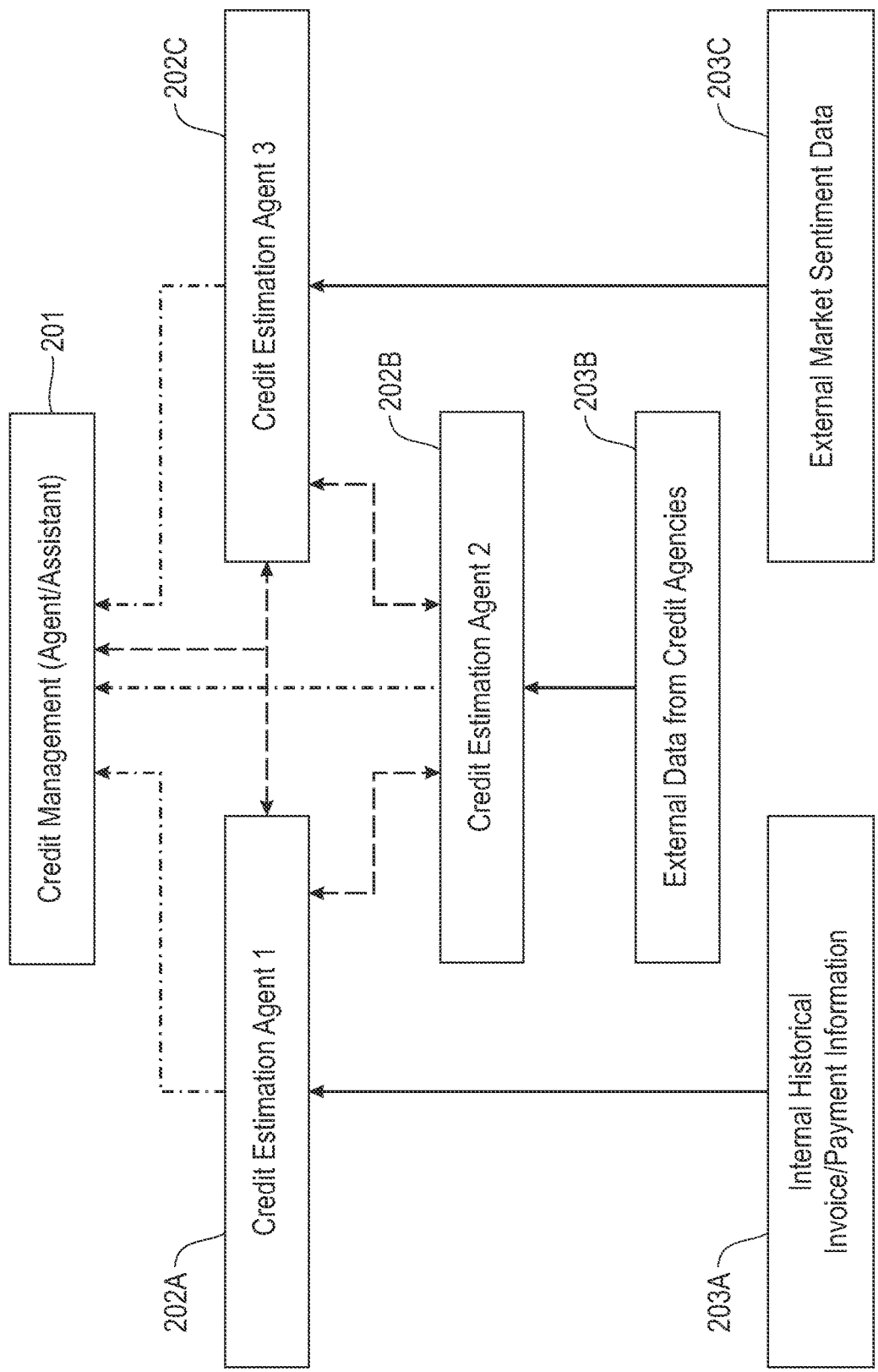
FIG. 2 illustrates an example system diagram of communication between the artificial intelligence agents to generate a credit attribute.

FIG. 2 illustrates three different artificial intelligent agents 202A, 202B, and 202C. Each of these agents analyzes a different information source, for example, Agent1 202A analyzes internal historical invoice/payment information 203A, Agent2 202B analyzes external data from credit agencies 203B, and Agent3 203C analyzes external market sentiment data 203C. In a first technique, the agents do not communicate among themselves. This technique is illustrated with the dotted/dashed lines going from each of the agents to a credit management agent or assistant 201. In this technique, the credit management agent 201 is responsible for aggregating the agent versions of the credit attribute. This aggregation may be a simple averaging of values or may be more complex, for example, by weighting different agent's values.

In a second technique, the agents communicate among themselves. This technique is illustrated with the dashed lines that look like a triangle and then the single line going from the triangle lines to the credit management agent or assistant 201. The agents 202A-202C each generate an agent version of the credit attribute and then communicate these values to the other agents. The agents then communicate among each other to reach a consensus for a final credit attribute. This consensus is considered an aggregation of the agent versions of the credit attribute even though it is not a true mathematical aggregation of the agent versions. In this technique, the credit management agent 201 is responsible for receiving the aggregated agent versions of the credit attribute. In either technique, the credit management agent 201 may then communicate the aggregated or final credit attribute to a human agent or the rest of the system.

In the event that the agents communicate with each other, whether that is to produce a consensus attribute value or for other reasons, the agents or system may want to keep the algorithm, models, parameters, techniques, or the like, for generating the agent version of the credit attribute private. In other words, the individual models, parameters, algorithm, techniques, or the like, utilized by each individual agent may not be shared among agents. Additional privacy options may also be utilized. For example, each agent may incorporate noise into the data that is shared. The information that may be shared is the agent version of the credit attribute. Accordingly, the agent may incorporate noise into this value. For example, if the agent actually calculates a credit line value of $623, the agent may add noise to the value and present a value of $650 to the other agents in order to further obfuscate the technique for calculating the agent version of the credit attribute. The agents may also provide a range instead of an exact value. The amount of noise added or technique for creating the range may be any technique. In the event that noise is added, when the consensus or aggregation is performed, the system may utilize a noisy data integration problem solution technique, for example, uncertainty weighted averaging, prediction models that utilize can make predictions using uncertain input data, or the like.

Different credit attributes may be based upon different information or a different analysis. For example, if the credit attribute is a credit line, the credit line may be a function of or based upon prior or historical invoice amounts and prior or historical payment amounts. If the customer is a new customer without any historical internal information, the artificial intelligence agents may select a default value for the credit line attribute, for example, a percentage of the invoice amount, a predetermined amount for all new customers, or the like. The credit line value may then increase as a customer, whether new or existing, maintains and extends a relationship with seller. The default value may also be based upon another credit attribute, for example, a credit score attribute. The credit line may be represented as a payment capacity, a vector in conjunction with a credit score, or the like. The credit line value may also be based upon internal factors unrelated to the customer. For example, each human agent may only be allowed a certain amount of deferral each month, week, year, or the like. The credit line attribute may take these internal factors into account when generating this attribute.

The credit score credit attribute may be a function of or based upon a timeliness of historical payments with the seller. In the event of a new customer, the artificial intelligence agents may analyze and rely on external information since internal information is unavailable. However, because the agents are relying on external information, the credit score value may be a reduced value as compared to a customer having available internal information. Alternatively, the agents may simply set a default credit score value. As the seller maintains and extends a relationship with the seller, the credit score value can increase or decrease based upon a timeliness of payments.

Once the credit attribute is generated for a customer, the system may determine whether a deferral of at least a portion of a pending invoice should be recommended at 103. Making this determination is based upon the value of the credit attribute, for example, the value of the credit line and/or credit score. For example, if the value of the credit attribute does not meet or exceed a predetermined value, the system may determine that a deferral should not be recommended. As another example, if the value of the credit attribute does not meet or exceed a predetermined percentage of the pending invoice amount, the system may determine that a deferral should not be recommended. On the other hand, if the value of the credit attribute does exceed the predetermined value, exceed a predetermined percentage, or otherwise meet some predefined criteria, the system may determine that a deferral should be recommended.

If the system determines that a deferral should not be recommended at 103, the system may take no action at 104. Alternatively, the system may notify a human agent of the same. If, on the other hand, the system determines that a deferral should be recommended at 103, the system may recommend a deferral of at least a portion of a pending invoice of the seller for the customer at 105. The value of the deferral is based upon the credit attribute. For example, a credit score or credit line value may provide an indication of how much of the invoice can be deferred.

The deferral recommendation may occur before the invoice is generated for the customer. In other words, rather than in conventional techniques where deferrals occur after a customer receives the invoice and the customer requests the deferral, the described system provides a deferral recommendation before the invoice is generated and provided to the seller, thereby making this system a proactive system. Thus, the deferral recommendation may be in response to some trigger event other than the buyer requesting a deferral. For example, a human agent of the seller may have a check-in conversation with the buyer or an agent of the buyer before the invoice is generated. This conversation may provide the human agent of the seller an indication that a deferral may be useful. Another possible trigger may be a predetermined time period of timely payments. In other words, the deferral may act as a type of reward for the customer. Other trigger events are possible and contemplated and these examples are not intended to be limiting.

Figure 3:
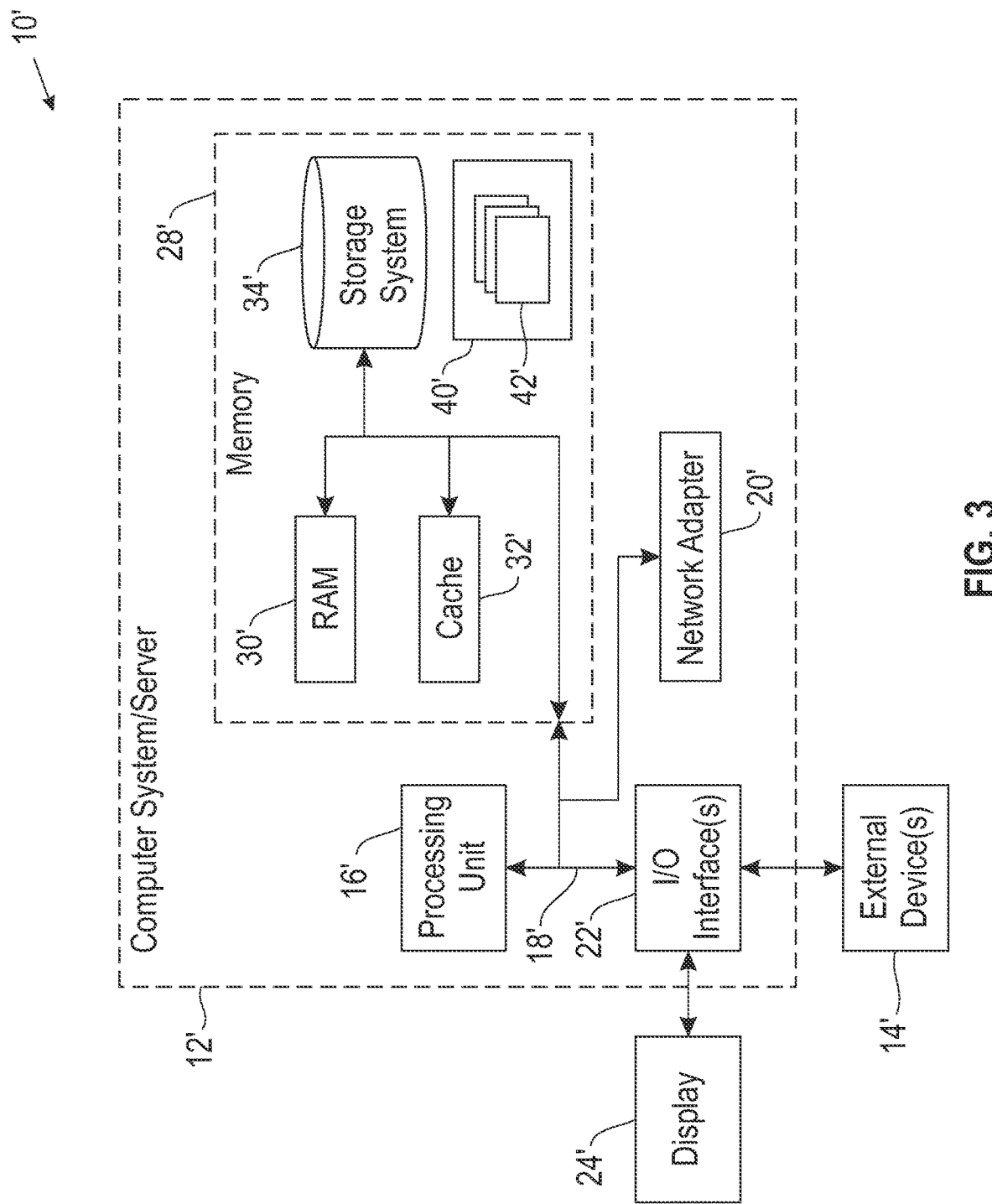
FIG. 3 illustrates a computer system.

As shown in FIG. 3, computer system/server 12' in computing node 10' is shown in the form of a general-purpose computing device. The components of computer system/server 12' may include, but are not limited to, at least one processor or processing unit 16', a system memory 28', and a bus 18' that couples various system components including system memory 28' to processor 16'. Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12'; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer implemented method, comprising:
receiving, at a credit management agent that communicates with a human agent, information corresponding to a customer of a seller, wherein the information is related to credit information of the customer;
generating, at the credit management agent, a credit attribute for the customer with respect to the seller, wherein the generating comprises utilizing a plurality of artificial intelligence agents that each analyze at least a subset of the information to each generate an agent version of the credit attribute, wherein each of the plurality of artificial intelligence agents analyzes a different source of information and analyzes the subset of the information corresponding to the different source of information assigned to the artificial intelligence agent, wherein the generating comprises the plurality of artificial intelligence agents communicating among themselves and generating, via a consensus among the plurality of artificial intelligence agents, the credit attribute by sharing and from the agent version of the credit attribute generated by each of the plurality of artificial intelligence agents, wherein, when communicating among themselves, each of the plurality of artificial intelligence agents keep techniques used to generate the agent version of the credit attribute private from the other of the plurality of artificial intelligence agents by adding noise to the agent version of the credit attribute that is shared among the plurality of artificial intelligence agents to obfuscate the technique for calculating the agent version of the credit attribute; and
recommending, by the credit management agent and to the human agent, a deferral of at least a portion of a pending invoice of the seller for the customer, wherein a value of the deferral is based upon the credit attribute, wherein the value of the deferral is further based upon an allowed amount of deferral over a time period for the human agent, wherein the recommending occurs before the pending invoice is provided to the seller.

2. The computer implemented method of claim 1, wherein the credit attribute comprises a credit line and is based upon historical invoice amounts and historical payment amounts.

3. The computer implemented method of claim 1, wherein the credit attribute comprises a credit score and is based upon a timeliness of historical payments.

4. The computer implemented method of claim 1, wherein the generating comprises aggregating, utilizing a management assistant, the plurality of agent versions of the credit attribute from the plurality of artificial intelligence agents.

5. The computer implemented method of claim 1, wherein each of the plurality of artificial intelligence agents do not share agent specific models and parameters with other of the plurality of artificial intelligence agents.

6. The computer implemented method of claim 1, wherein each of the plurality of artificial intelligence agents adds noise to the agent version of the credit attribute.

7. The computer implemented method of claim 1, wherein the information comprises at least one of: information from an external credit agency, information related to a payment history of the customer to the seller, and market sentiment data.

8. The computer implemented method of claim 1, wherein the recommending occurs before the invoice is generated for the customer.

9. An apparatus, comprising:
at least one processor; and
a computer readable storage medium having computer readable program code embodied therewith and executable by the at least one processor:
wherein the computer readable program code is configured to receive, at a credit management agent that communicates with a human agent, information corresponding to a customer of a seller, wherein the information is related to credit information of the customer;
wherein the computer readable program code is configured to generate, at the credit management agent, a credit attribute for the customer with respect to the seller, wherein the generating comprises utilizing a plurality of artificial intelligence agents that each analyze at least a subset of the information to each generate an agent version of the credit attribute, wherein each of the plurality of artificial intelligence agents analyzes a different source of information and analyzes the subset of the information corresponding to the different source of information assigned to the artificial intelligence agent, wherein the generating comprises the plurality of artificial intelligence agents communicating among themselves and generating, via a consensus among the plurality of artificial intelligence agents, the credit attribute by sharing and from the agent version of the credit attribute generated by each of the plurality of artificial intelligence agents, wherein, when communicating among themselves, each of the plurality of artificial intelligence agents keep techniques used to generate the agent version of the credit attribute private from the other of the plurality of artificial intelligence agents by adding noise to the agent version of the credit attribute that is shared among the plurality of artificial intelligence agents to obfuscate the technique for calculating the agent version of the credit attribute; and
wherein the computer readable program code is configured to recommend, by the credit management agent and to the human agent, a deferral of at least a portion of a pending invoice of the seller for the customer, wherein a value of the deferral is based upon the credit attribute, wherein the value of the deferral is further based upon an allowed amount of deferral over a time period for the human agent, wherein the recommending occurs before the pending invoice is provided to the seller.

10. A computer program product, comprising:
a computer readable storage medium having computer readable program code embodied therewith, the computer readable program code executable by a processor:
wherein the computer readable program code is configured to receive, at a credit management agent that communicates with a human agent, information corresponding to a customer of a seller, wherein the information is related to credit information of the customer;
wherein the computer readable program code is configured to generate, at the credit management agent, a credit attribute for the customer with respect to the seller, wherein the generating comprises utilizing a plurality of artificial intelligence agents that each analyze at least a subset of the information to each generate an agent version of the credit attribute, wherein each of the plurality of artificial intelligence agents analyzes a different source of information and analyzes the subset of the information corresponding to the different source of information assigned to the artificial intelligence agent, wherein the generating comprises the plurality of artificial intelligence agents communicating among themselves and generating, via a consensus among the plurality of artificial intelligence agents, the credit attribute by sharing and from the agent version of the credit attribute generated by each of the plurality of artificial intelligence agents, wherein, when communicating among themselves, each of the plurality of artificial intelligence agents keep techniques used to generate the agent version of the credit attribute private from the other of the plurality of artificial intelligence agents by adding noise to the agent version of the credit attribute that is shared among the plurality of artificial intelligence agents to obfuscate the technique for calculating the agent version of the credit attribute; and wherein the computer readable program code is configured to recommend, by the credit management agent and to the human agent, a deferral of at least a portion of a pending invoice of the seller for the customer, wherein a value of the deferral is based upon the credit attribute, wherein the value of the deferral is further based upon an allowed amount of deferral over a time period for the human agent, wherein the recommending occurs before the pending invoice is provided to the seller.

11. The computer program product of claim 10, wherein the credit attribute comprises a credit line and is based upon historical invoice amounts and historical payment amounts.

12. The computer program product of claim 10, wherein the credit attribute comprises a credit score and is based upon a timeliness of historical payments.

13. The computer program product of claim 10, wherein the generating comprises aggregating, utilizing a management assistant, the plurality of agent versions of the credit attribute from the plurality of artificial intelligence agents.

14. The computer program product of claim 10, wherein each of the plurality of artificial intelligence agents do not share agent specific models and parameters with other of the plurality of artificial intelligence agents.

15. The computer program product of claim 10, wherein the information comprises at least one of: information from an external credit agency, information related to a payment history of the customer to the seller, and market sentiment data.

16. The computer program product of claim 10, wherein the recommending occurs before the invoice is generated for the customer.

* * * * *